United States Patent [19]

Herbst et al.

[11] Patent Number: 4,892,643

[45] Date of Patent: Jan. 9, 1990

[54] UPGRADING NAPHTHA IN A SINGLE RISER FLUIDIZED CATALYTIC CRACKING OPERATION EMPLOYING A CATALYST MIXTURE

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 336,571

[22] Filed: Apr. 11, 1989

Related U.S. Application Data

[63] Continuation of Ser. No. 191,716, May 2, 1988, abandoned, which is a continuation of Ser. No. 903,343, Sep. 3, 1986, abandoned.

[51] Int. Cl.$^4$ .............................................. C10G 63/04
[52] U.S. Cl. ........................................ 208/70; 208/49; 208/74; 208/120; 208/153
[58] Field of Search ................. 208/70, 49, 74, 120, 208/153

[56] References Cited

U.S. PATENT DOCUMENTS

| | | | |
|---|---|---|---|
| 3,617,497 | 11/1971 | Bryson et al. | 208/80 |
| 3,748,251 | 7/1973 | Demmel et al. | 208/74 |
| 3,769,202 | 10/1973 | Plank et al. | 208/120 |
| 3,847,793 | 11/1974 | Schwartz et al. | 208/74 |
| 3,849,291 | 11/1974 | Owen | 208/78 |
| 3,894,931 | 7/1975 | Nace et al. | 208/73 |
| 3,894,932 | 7/1975 | Owen | 208/74 |
| 3,894,933 | 7/1975 | Owen et al. | 208/77 |
| 3,894,934 | 7/1975 | Owen et al. | 208/78 |
| 3,894,935 | 7/1975 | Owen | 208/78 |
| 3,926,778 | 12/1975 | Owen et al. | 208/74 |
| 3,928,172 | 12/1975 | Davis, Jr. et al. | 208/77 |
| 3,974,062 | 8/1976 | Owen et al. | 208/74 |
| 4,032,432 | 6/1977 | Owen | 208/71 |
| 4,116,814 | 9/1978 | Zahner | 208/78 |
| 4,287,088 | 9/1981 | Sirkar | 208/52 CT |
| 4,309,279 | 1/1982 | Chester et al. | 208/120 |
| 4,368,114 | 1/1983 | Chester et al. | 208/120 |
| 4,560,536 | 12/1985 | Tabak | 208/70 |
| 4,624,771 | 11/1986 | Lane et al. | 208/74 |
| 4,717,466 | 1/1988 | Herbst et al. | 208/113 |
| 4,752,375 | 6/1988 | Herbst et al. | 208/72 |
| 4,787,967 | 11/1988 | Herbst et al. | 208/113 |
| 4,802,971 | 2/1989 | Herbst et al. | 208/72 |
| 4,814,068 | 3/1989 | Herbst et al. | 208/113 |
| 4,826,586 | 5/1989 | Herbst et al. | 208/120 |
| 4,830,728 | 5/1989 | Herbst et al. | 208/120 |

FOREIGN PATENT DOCUMENTS 0127285  5/1984  European Pat. Off. ............ 208/120

*Primary Examiner*—Anthony McFarlane
*Attorney, Agent, or Firm*—Alexander J. McKillop; Charles J. Speciale; Richard D. Stone

[57] ABSTRACT

The present invention discloses a catalytic cracking operation featuring a single riser in which a variety of hydrocarbon conversion reactions takes place, a stripping unit in which entrained hydrocarbon material is removed from catalyst and a regeneration zone in which spent cracking catalyst is regenerated, which comprises:

(a) converting a relatively high boiling charge material introduced to the riser at a lower level thereof in the presence of a first catalyst component which is an amorphous cracking catalyst and/or a large pore crystalline silicate cracking catalyst to provide lighter products including significant quantities of naphtha; and, (b) converting a naphtha charge material introduced to the riser at a higher level thereof in the presence of a second catalyst componet which is a shape selective medium pore crystalline silicate zeolite catalyst to provide a relatively high octane gasoline product.

8 Claims, 2 Drawing Sheets

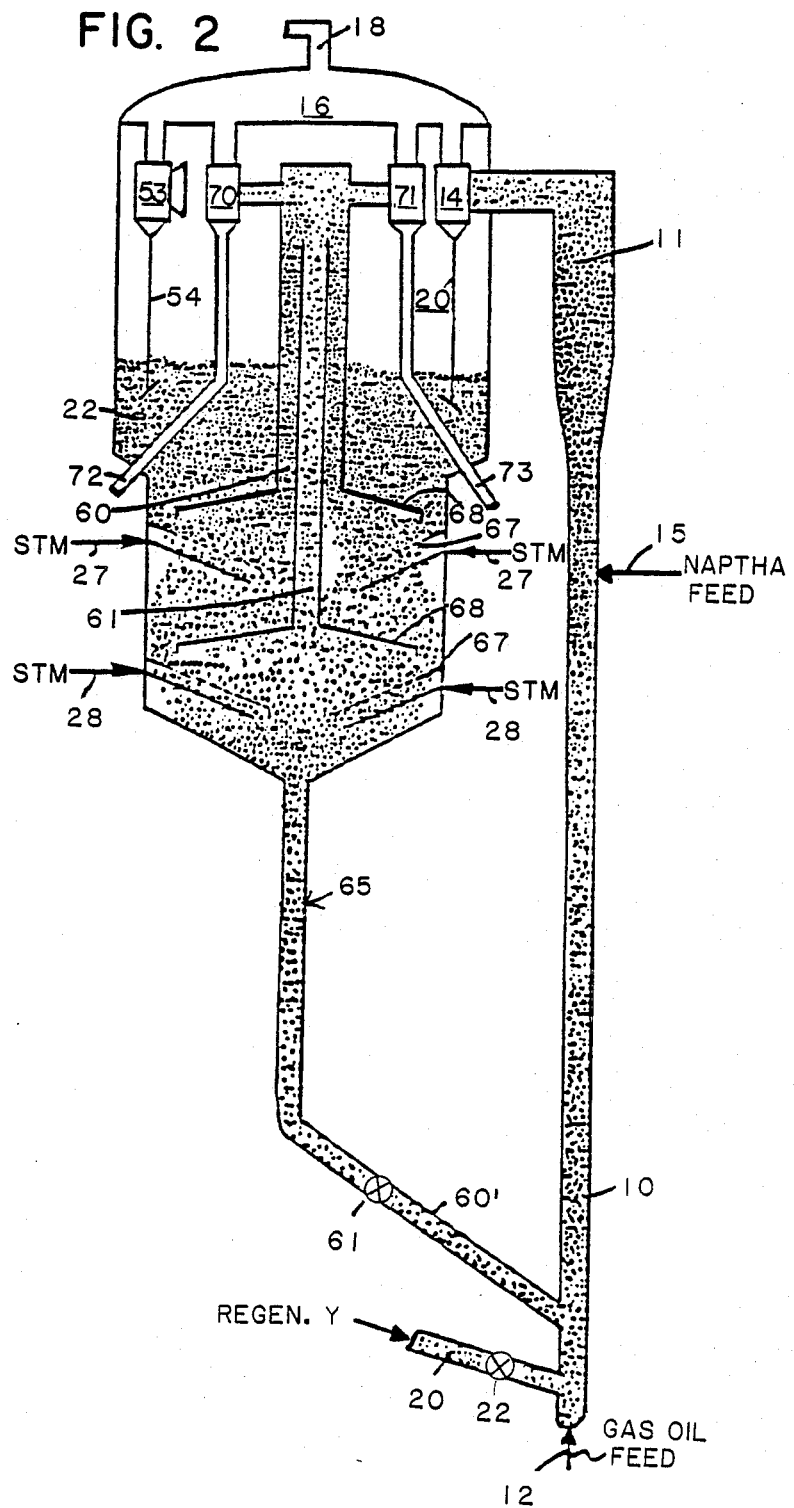

UPGRADING NAPHTHA IN A SINGLE RISER FLUIDIZED CATALYTIC CRACKING OPERATION EMPLOYING A CATALYST MIXTURE

This is a continuation of copending application Ser. No. 191,716, filed on May 2, 1988, now abandoned, which is a continuation of application Ser. No. 903,343 filed Sept. 3, 1986, now abandoned.

BACKGROUND OF THE INVENTION

This invention relates to a process for upgrading a naphtha, e.g., straight run naphtha, catalytically cracked naphtha (FCC gasoline), etc., and mixtures thereof, in a single riser fluid catalytic cracking operation utilizing a mixture of amorphous cracking catalyst and/or large pore crystalline cracking catalyst, e.g., zeolite Y, and a shape selective medium pore crystalline silicate zeolite catalyst, e.g., zeolite ZSM-5.

In known and conventional fluidized catalytic cracking processes, a relatively heavy hydrocarbon feedstock, e.g., a gas oil, admixed with a suitable cracking catalyst, e.g., a large pore crystalline silicate zeolite such as zeolite Y, to provide a fluidized suspension is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidized catalyst is continuously circulate between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,051,013, 3,748,251, 3,849,291, 3,894,931, 3,894,933, 3,894,934, 3,894,935 3,926,778, 3,928,172, 3,974,062 and 4,116,814 (multiple risers).

In accordance with the fluid catalytic cracking process of U.S. Pat. No. 4,051,013, a naphtha feed and a gas oil feed are converted in the presence of amorphous or zeolite cracking catalyst, preferably the latter, in a riser reaction zone to provide a high octane gasoline.

Several of the aforementioned processes employ a mixture of catalysts having distinctly different catalytic properties as, for example, the dual riser catalytic cracking process described in U.S. Pat. No. 3,928,172 which utilizes a mixture of a large pore crystalline silicate zeolite cracking catalyst, e.g., zeolite REY, and a shape selective medium pore crystalline silicate zeolite, e.g., ZSM-5. According to this process, a gas oil is cracked in a first riser in the presence of the aforesaid catalyst mixture, principally as a result of the zeolite REY component thereof, to provide a heavy naphtha product, the latter being recracked and/or a virgin straight run naphtha being cracked in a second riser in the presence of the catalyst mixture to provide a high octane gasoline product together with varying quantities of $C_3$ and $C_4$ olefins.

SUMMARY OF THE INVENTION

It is an object of the invention to upgrade naphtha to a relatively high octane gasoline product in a fluid catalytic cracking operation featuring a single riser reaction zone and at least one stripping zone and catalyst regeneration zone employing a mixed catalyst system comprising, as a first catalyst component, an amorphous cracking catalyst and/or a large pore crystalline silicate cracking catalyst and, as a second catalyst component, a shape selective medium pore crystalline silicate zeolite catalyst.

It is a particular object of the present invention to carry out a fluidized catalytic cracking operation employing said mixed catalyst system in which a heavy hydrocarbon feed, e.g., gas oil and/or resid, is cracked in a lower region of the riser reaction zone, primarily due to the presence of the first catalyst component, to provide lighter products and a naphtha is selectively cracked in a higher region of the riser, primarily due to the presence of the second catalyst component, to provide a relatively high octane gasoline product.

It is still another object of the invention to upgrade a naphtha feed to a high octane gasoline product in a single riser catalytic cracking unit wherein different physical characteristic(s) of the first and second catalyst components permit separation, or segregation of the catalyst components within a common stripping vessel and/or a prolongation of the residency time of the second catalyst component within the riser, the net result being a capability for reducing the rate of circulation of the less coke deactivated second catalyst component through the regeneration zone, and consequently, maintaining a high level of its catalytic activity.

In keeping with the foregoing objects, there is provided a catalytic cracking operation featuring a single riser in which a variety of hydrocarbon conversion reactions take place a stripping unit in which entrained hydrocarbon material is removed from catalyst and a regeneration zone in which spent cracking catalyst is regenerated, which comprises:

(a) converting a relatively high boiling charge material introduced to the riser at a lower level thereof in the presence of a first catalyst component which is an amorphous cracking catalyst and/or a large pore crystalline silicate cracking catalyst to provide lighter products including significant quantities of naphtha; and, (b) converting a naphtha charge material introduced to the riser at a higher level thereof in the presence of a second catalyst component which is a shape selective medium pore crystalline silicate zeolite catalyst to provide a relatively high octane gasoline product.

The term "catalyst" as used herein shall be understood to apply not only to a catalytically active material but to one which is composited with a suitable matrix component which may or may not itself be catalytically active.

By introducing the naphtha charge material further up the riser, it is possible to take advantage of the unique catalytic properties of the shape selective zeolite catalyst component without incurring much in the way of undesirable reactions attributable to the cracking catalyst component which, by now, is largely inactive due to coking. The selective cracking of the naphtha feed to light olefins, e.g., $C_{3-6}$ olefins, and other reactions characteristic of the shape selective medium pore crystalline silicate zeolites, e.g., oligomerization, alkylation, isomerization, aromatization, etc., constitute the principal conversion reactions occurring in this higher region of the riser and result in the production of a gasoline product of increased RON and MON.

BRIEF DESCRIPTION OF THE DRAWINGS

FIGS. 1 and 2 schematically illustrate preferred embodiments of a naphtha upgrading operation in accordance with this invention, i.e., one in which the stripping unit features means for separating the first and second catalyst components based primarily on differences in their average particle sizes and densities, such arrangement making it possible to cycle the second catalyst component without exposing it the catalyst-degrading conditions of the regenerator.

DESCRIPTION OF THE PREFERRED EMBODIMENTS

Figure 1:
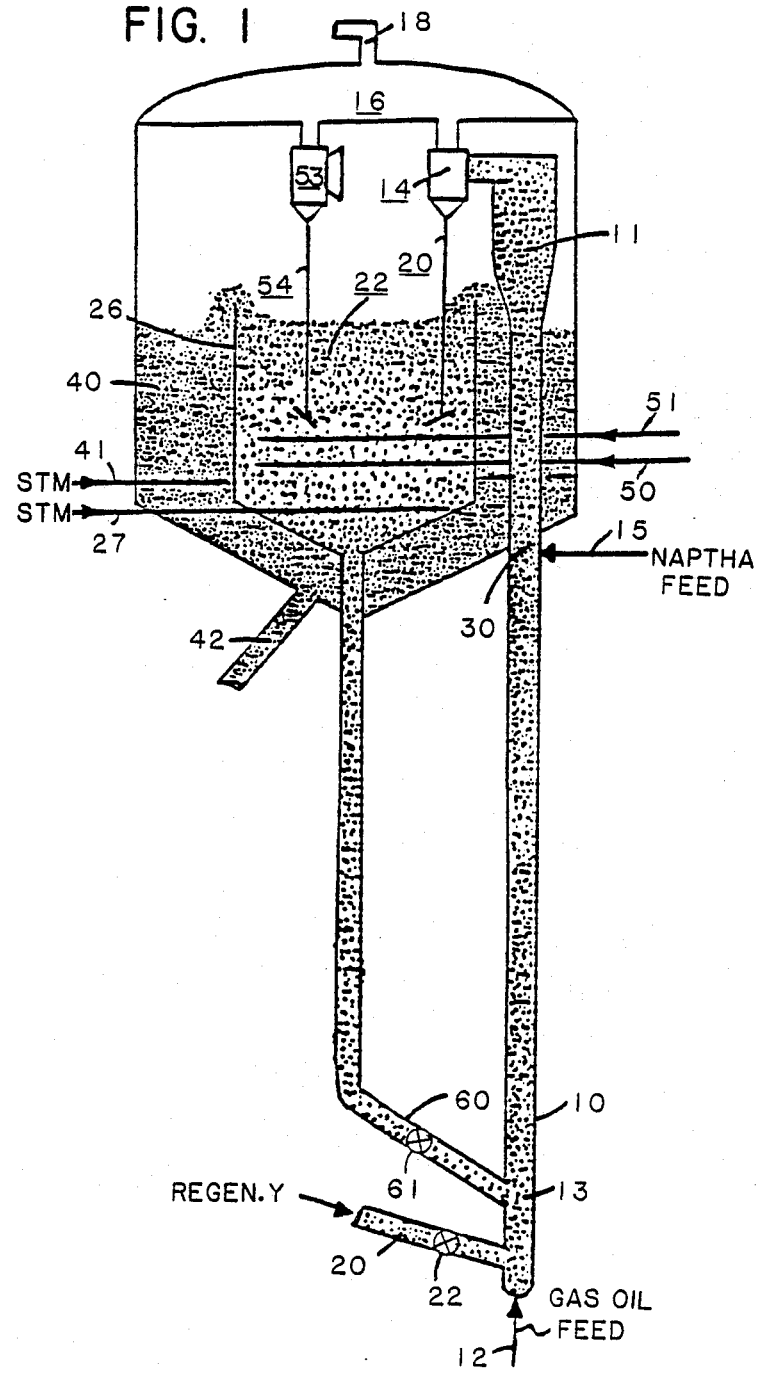

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts as the first catalyst component of the mixed catalyst system. Preferred crystalline zeolite components of the mixed catalyst system herein include the natural zeolites mordenite and faujasite and the synthetic zeolites X and Y with particular preference being accorded zeolites Y, REY, USY and RE-USY.

The shape selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Reissue Pat. No. 29,948 describing and claiming a crystalline material with an X-ray diffraction pattern of ZSM-5, is incorporated herein by reference as is U.S. Pat. No. 4,061,724 describing a high silica ZSM-5 referred to as "silicalite" therein.

ZSM-=11 is more particularly described in U.S. Pat. No. 3,709,979, the entire contents of which are incorporated herein by reference.

ZSM-12, is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective medium pore crystalline silicate zeolite components of the mixed catalyst system herein are ZSM-5, ZSM-11, ZSM-12, ZSM-23, ZSM-35, ZSM-38 and ZSM-48 with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and any other trivalent metal which is heavier than aluminum. Specific examples of such catalysts include ZSM-5 and zeolite Beta containing boron, gallium and/or titanium. In lieu of, or in addition to, being incorporated into the zeolite framework, these and other catalytically active elements can also be deposited upon the zeolite by any suitable procedure, e.g., impregnation.

In known and conventional fluidized catalytic cracking operations employing mixtures of large and medium pore size crystalline silicate zeolite catalysts where catalyst separated from the product effluent is conveyed to a stripper and from there to a catalyst regenerating zone, regardless of the nature of the catalyst introduction at start-up, once steady-state operation has been achieved, the two types of catalyst will become fairly uniformly mixed and will circulate throughout the system at or about the same rate. This arrangement is subject to a significant disadvantage. While the large pore zeolite cracking catalyst cokes up relatively quickly and must therefore be regenerated at frequent intervals, this is not the case with the medium pore zeolite catalysts which can maintain their catalytic activity over many more cycles of operation. However, since the large and medium pore zeolite catalysts are in intimate admixture, heretofore there has been no practical means of conveying only the large pore zeolite catalyst to the catalyst regenerator unit or, what amounts to the same thing, keeping the medium pore zeolite catalyst, or at least most of it, on the average out of the regenerator.

Thus, a principal disadvantage resulting from the use of mixed catalyst systems in known fluidized catalytic cracking operations is owing to the fact that the medium pore zeolite catalyst component is subjected to the harsh hydrothermal conditions of the catalyst regenerator unit even though it does not require regeneration anywhere near the rate at which the large pore zeolite cracking catalyst component must be regenerated. The medium pore zeolite catalyst is therefore needlessly subjected to hydrothermal deactivation at a much greater rate than is necessary for it to function.

Separating the mixed catalyst system into its first and second catalyst components in accordance with preferred embodiments of the process herein for upgrading naphtha does much to overcome this drawback. Thus, once particles of first component are separated from particles of second component, the former can be conveyed to the regenerator while the latter can be cycled directly back to the appropriate riser thereby avoiding passage through the regenerator. Such separation can precede or follow stripping of the catalyst components. As applied, for example, to a fluidized catalytic cracking process in which a cracking catalyst requiring frequent regeneration such as zeolite Y is employed in combination with a less coke deactivated shape selective medium pore crystalline silicate zeolite catalyst requiring relatively infrequent regeneration such as ZSM-5, the present invention makes it possible to sustain a relatively high level of activity of the latter catalyst for much longer average periods than would otherwise be the case due to the reduced incidence of its exposure to the catalyst-degrading environment of the regenerator zone. This, in turn permits the refiner to take greater advantage of the unique catalytic capabilities of ZSM-5 in a catalytic cracking operation.

Separation of particles of first catalyst component from particles of second catalyst component in the stripping unit can be accomplished in several ways. For example, the two components can be provided in such different average particle sizes that they can be readily sorted within a stripping unit possessing suitable sieving means.

Separation within the stripping zone can also be achieved by classifying the first and second catalyst components according to their average particle densities which can be made to be significantly different in various ways including by appropriate selection of the matrix components with which they are composited as more fully explained below. In general, smaller, less dense catalyst particles will tend on the average to define an upper phase within the stripper floating upon larger, more dense catalyst particles which, conversely, will tend on the average to define a lower phase within the stripper.

It is also within the scope of this invention to impart such different physical characteristic(s) to the first and second catalyst components that they each will exhibit different settling rates, designated $R_1$ and $R_2$ respectively, which permit the catalyst particles having the greater settling rate to remain within the riser reaction zone longer than the catalyst particles having the lower settling rate. Preferably, the second catalyst component, i.e., the less coke deactivated one, is given a higher settling rate as to reside in the riser for a longer period of time than the first catalyst component.

Residency time of catalyst particles in a riser is primarily dependent on two factors: the linear velocity of the fluid stream within the riser which tends to carry the entire catalyst bed/conversion products/uncovered feed up and out of the riser into the separator unit and the opposing force of gravity which tends to keep the slower moving catalyst particles within the riser. Ordinarily, in a mixed catalyst system, both catalyst components will circulate through the system at about the same rate. As previously pointed out, this has proven disadvantageous to the efficiency of the system since the medium pore zeolite catalyst or other catalyst component which does not require as frequent regeneration as the cracking catalyst will be needlessly subjected to the catalyst-degrading conditions of the regenerator with the result that its useful catalytic life will be shortened. However, in accordance with this invention, it is possible to retain the less coke deactivated catalyst within the riser, even to the point where, because of a balance between the upward velocity of this catalyst component and its settling rate, it can be made to remain more or less stationary, or suspended, at any desired level within the riser defining a zone of concentration therein. To bring about this balance or to otherwise prolong the residency time of a particular component of the mixed catalyst system within the riser, the average density, particle size and/or shape of the catalyst particles can be adjusted in a number of ways as to provide the desired settling characteristics. As a general guide, as the average particle size of the catalyst increases and/or its average particle density increases, the residency time of the catalyst will increase.

Assuming, for example, this differential in $R_1$ and $R_2$ is accomplished by making the particles of the second catalyst component initially larger and of greater density than the particles of first catalyst component and perhaps even more irregular in shape than the latter, gradual attrition of the larger particles (through particle collision) will progressively reduce their capability for prolonged residency in the riser and as time goes on, increasing quantities of such particles will enter the stripping zone where, however, they can still be readily separated based on their different densities as later more fully explained. This arrangement, i.e., increased residency time in the riser coupled with separation in the stripping zone, maximizes the capability of the catalytic cracking process of this invention for reducing the rate of circulation of the less coke deactivated catalyst particles through the regenerator zone.

Among the techniques which can be used for making one catalyst component more dense than the other is compositing each catalyst with a matrix component of substantially different density. Useful matrix components include the following:

| matrix component | particle density (gm/cm$^3$) |
| --- | --- |
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be more dense than the catalyst requiring frequent regeneration. For example, in the case of a mixed catalyst system containing medium pore and large pore crystalline silicate zeolites where it is desired to increase the residency time of the medium pore zeolite catalyst in the riser, the overall packed density of the medium pore zeolite catalyst particles inclusive of its matrix component can advantageously vary from about 0.6 to about 4.0 gm/cm$^3$, and preferably from about 2.0 to about 3.0 gm/cm$^3$, and the overall packed density of the large pore zeolite catalyst particles inclusive of its matrix component can advantageously vary from about 0.4 to about 1.1 gm/cm$^3$ density, and preferably from about 0.6 to about 1.0 gm/cm$^3$.

Another useful technique for adjusting the density of each catalyst component, again in the case of a mixture of medium and large pore zeolite catalysts, is to composite the medium pore zeolite catalyst particles with a material which tends to coke up faster than the particles of large pore zeolite catalyst, such resulting in an increase in the density of the former in situ. Illustrative of such materials are hydrated alumina which in situ forms a transition alumina which has a faster coking rate than, for example, zeolite Y. This embodiment possesses several additional advantages. In the coked-up state, the composited medium pore silicate zeolite catalyst is more resistant to attrition which results from collision with other particles in the riser. The individual catalyst particles can sustain more collisions and thus serve as a practical means of adjusting the velocity of the large pore zeolite catalyst particles through the riser (the latter in colliding with the medium pore zeolite particles will, as a result, have reduced velocity). In addition, the coked-up composited medium pore zeolite catalyst particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to remain within the riser longer than the smaller. Where it is desired to increase the residency time, say, of the medium pore zeolite catalyst particles in the riser over that of the large pore catalyst component, the average particle size of the former will usually be larger than that of the latter. So, for example, the average particle size of the medium pore zeolite catalyst particles can be made to vary from about 500 microns to about 70,000 microns, and preferably from about 1000 to about 25,000 microns while the average particle size of the large pore zeolite catalyst particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the longer the residency time of the particles in the riser. Irregular-shaped particles can be simply and readily achieved by crushing the catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the less coke deactivated catalyst can simultaneously be made denser, larger and more irregular in shape than the catalyst particles requiring frequent regeneration. However, a differential settling rate can still be provided even if one of the foregoing factors partially offsets another as would be the case where greater density and smaller average particle size coexist in the same catalyst particle. Regardless of how these factors of particle density, size and shape are established for a particular catalyst component, their combined effect will, of course, be such as to result in a significant differential in settling rates of the components comprising the mixed catalyst system of this invention.

By varying the cross sectional geometry of the riser, it is possible to further prolong the residency time therein of the denser, larger and/or more irregularly shaped catalyst particles. Numerous geometric configurations can be utilized to achieve this effect. So, for example, the riser can be made to flare outwardly for a part of its length. In one such arrangement, some portion of the upper section of the riser can be flared outwardly. The denser, larger and/or more irregularly shaped particles will tend to occupy the flared region of the riser as to constitute a zone of concentration therein.

The shape selective medium pore crystalline silicate zeolite catalyst can be present in the mixed catalyst system over widely varying levels. For example, the zeolite in the second catalyst component can be present at a level as low as about 0.01 to about 1.0 weight percent of the total catalyst inventory (as in the case of the catalytic cracking process of U.S. Pat. No. 4,368,114) and can represent as much as 25 weight percent of the total catalyst system.

Suitable charge stocks for cracking in the first riser comprise the hydrocarbons generally and, in particular, petroleum fractions having an initial boiling point range of at least 400° F., a 50% point range of at least 500° F. and an end point range of at least 600° F. Such hydrocarbon fractions include gas oils, thermal oils, residual oils, cycle stocks, whole top crudes tar sand oils, shale oils, synthetic fuels heavy hydrocarbon fractions derived from the destructive hydrogenation of coal, tar pitches, asphalts, hydrotreated feedstocks derived from any of the foregoing, and the like. As will be recognized, the distillation of higher boiling petroleum fractions above about 750° F. must be carried out under vacuum in order to avoid thermal cracking.

The expression "naphtha charge material" shall be understood to include any hydrocarbon charge stock boiling in the range of C$_5$ hydrocarbons up to about 450° F. Such charge materials are generally unsuitable for use as motor fuel or motor fuel components because of their relatively low octane rating, poor stability, high contaminant levels of sulfur or nitrogen or both or any combination of these characteristics. Examples of suitable naphtha charge materials include coker naphtha, visbreaker naphtha, pyrolysis naphtha (from an ethylene operation), straight run naphtha and catalytically cracked naphtha.

FIGS. 1 and 2 each describes the stripping section of a single riser fluidized cracking unit provided with means for separating particles of ZSM-5 catalyst from particles of zeolite Y catalyst based primarily upon the difference in the densities of these two types of catalyst components. The riser component of the fluidized cracking units shown in FIGS. 1 and 2 is of a preferred type, i.e., its cross-sectional geometry has been modified for a portion of its length so as to alter the linear velocity of the fluid stream in the modified region. The purpose of this feature is to further prolong the residency time of the ZSM-5 catalyst particles, which are both larger and of greater density than the zeolite Y catalyst particles, in the riser. Thus, as shown, the upward flow of the fluid stream containing gaseous conversion products and both catalyst components encounters an outwardly flared region 11 which contains a large percentage of the ZSM-5 catalyst particles of the mixed catalyst system. The ZSM-5 catalyst particles occupying this region possess a combination of density, average particle size and perhaps even shape such that the linear velocity of the suspension in this region which would tend to carry the ZSM-5 catalyst particles up and out of riser is in approximate balance with the settling rate of these particles. Such being the case, the ZSM-5 catalyst particles or at least the bulk of them, remain more or less stationary, or suspended, in region 11 of riser 10 where they catalyze a variety of other conversions involving the hydrocarbons present in this region including selective cracking of the naphtha charge to light olefins such as $C_{3-6}$ olefins as well as oligomerization, alkylation, isomerization, aromatization, etc., the result of which, as previously indicated, the production of a gasoline product of increased RON and MON. Meanwhile, the particles of spent catalyst zeolite Y, being less dense, smaller and/or more regular in shape than the ZSM-5 particles, continue past flared region 11 together with the gasiform products of conversion and are ultimately discharged from the top of the riser into one or more cyclonic separation zones adjacent the second riser discharge as represented by cyclone separator 14 provided with dipleg 20.

Although as indicated earlier, the ZSM-5 catalyst particles have an initially greater average particle size and density than that of the zeolite Y catalyst particles and therefore can be made to form a zone of concentration in the flared upper section 11 of riser 10, eventually they will become reduced in size due to the inevitable particle collisions which constantly take place in the system. As time goes, more and more of the ZSM-5 catalyst particles will enter catalyst bed 22 where, however, their higher density permits them to be separated by a variety of arrangements, two of which are shown in FIGS. 1 and 2.

Referring to FIG. 1, there is shown a riser reactor 10 provided with a gas oil feed boiling in the range of from about 600° F. to about 1200° F. introduced into lower region 13 through conduit 12. The gas oil combines with hot regenerated zeolite Y catalyst particles conveyed through conduit 20 provided with flow control valve 22 and with ZSM-5 catalyst particles transferred directly from vessel 26 through line 60 provided with flow control valve 61 to form a suspension. The conversion conditions within the lower region of riser 10 can be varied depending upon whether it is desired to maximize production of naphtha or light olefins, principally $C_3$ and $C_4$ olefins. When it is desired to emphasize the production of naphtha, the ZSM-5 zeolite concentration in the second catalyst component can represent from about 0.01 to about 10, and preferably from abut 0.1 to about 5.0, weight percent of the total catalyst mixture and the temperature can range from about 900° to about 1150° F. and preferably from about 925° to about 100° F., the catalyst to oil ratio can range from about 3:1 to about 20:1 and preferably from about 4:1 to about 10:1 and the catalyst contact time can range from about 0.5 to about 30 seconds and preferably from about 1 to about 15 seconds. When, however, light olefin production (at the expense of naphtha) is desired, the ZSM-5 zeolite concentration of the second catalyst component can comprise from about 0.5 to about 25, and preferably from about 1 to about 10, weight percent of the total catalyst mixture, the temperature, catalyst to oil ratio and catalyst contact time being selected from the aforementioned ranges. During passage of the suspension through the lower region of the riser, conversion of the gas oil feed to lower and higher boiling products occurs.

A naphtha feed, e.g., a catalytically cracked naphtha and/or a straight run naphtha, introduced further up riser 10 in region 30 through conduit 15 combines with the ascending catalyst-hydrocarbon vapor mixture at a temperature within the range of from about 950° to about 1250° F. The point of introduction of the naphtha in riser 10 will be determined to a large extent by the degree to which the zeolite Y catalyst has become inactive due to coking. In general, the naphtha will be introduced in a higher region of the riser where the spent zeolite Y catalyst, having little of its activity remaining, will not participate to any significant step in the conversion of the naphtha co-feed to other products, such conversion being left largely to the influence of the ZSM-5 catalyst component. A variety of reactions characteristic of those catalyzed by ZSM-5 will therefore predominate in this higher region of the riser. Thus, selective cracking of naphtha to lighter materials, largely light olefins both within and outside the gasoline boiling range, and conversion of light olefins via oligomerization, cyclization, aromatization, alkylation, etc., all contribute to the production of a quality gasoline product of relatively high octane rating. The catalyst-hydrocarbon suspension continues to ascend riser 10, enters flared region 11 (which, as previously explained, serves to further prolong the residency time of larger denser particles of ZSM-5 catalyst in the riser) and from there passes to cyclone separator 14 which separates catalyst particles from gases, the former entering catalyst bed 22 via dipleg 20 and the latter entering plenum chamber 16 for transfer through conduit 18 to a downstream product separation facility (not shown). Vessel 26 which occupies an approximately central region of the stripping zone is provided with a source of stripping gas, e.g., steam, supplied through conduit 27 in the lower section thereof. The particles of ZSM-5 catalyst, being of greater average density than the zeolite Y catalyst particles tend to gravitate toward and concentrate at the bottom of vessel 26 and, following stripping, to enter return conduit 60 for return to riser 10. Meanwhile, the ascending current of stripping gas and desorbed hydrocarbonaceous material acts as a lift medium tending to carry lower density particles of zeolite Y catalyst out of vessel 26 into an outer peripheral region 40 the lower section of which is provided with its own supply of stripping gas, again, e.g., steam, through conduit 41. Stripping gas and other gasiform material is separated from catalyst particles in cyclone separator 53, the former passing to plenum chamber 16 and the latter entering catalyst bed 22 via dipleg 54. Stripped, spent zeolite Y catalyst continues its downward flow movement and is withdrawn from the stripper through conduit 42 where it is conveyed to the regenerating zone.

In order to enhance the overall efficiency of the operation, a light olefin feed, e.g., a gas rich in ethylene and/or propylene, can be introduced into catalyst bed 22 in the lower region thereof through conduit 50 to produce higher weight products and an exotherm which improves the desorption efficiency of the stripping operation. In general, the quantity of light olefin feed should be such as to increase the temperature of the catalyst bed in this region by at least about 50° F., and preferably by at least about 100° F. To accomplish this, from about 0.5 to about 20, and preferably from about 1 to about 10, weight percent of light olefin feed can be introduced into this phase by weight of total catalyst present in the stripper.

Ordinarily, then, the temperature of catalyst bed 22 will increase from its usual range of about 880°–1150° F. to about 930°–1250° F. and even higher. This increase in spent catalyst bed temperature significantly enhances the stripping, or desorption, of hydrocarbons and, where present, sulfur compounds, which are entrained by the catalyst particles. It is possible to increase the recovery of such entrained hydrocarbons by from about 5 to about 30 weight percent or more compared to substantially the same stripping procedure carried out in the absence of the exothermic conversion reaction herein. Optionally where the light olefin feed in line 50 is predominantly made up of ethylene, one or more other highly reactive light olefins, e.g., propylene, butylene or mixtures thereof, can be introduced into the lower region of catalyst bed 22 through a separate conduit 51 in order to take advantage of the higher partial pressure of the ethylene contained in the feed stream introduced through line 50 located therebelow. Amounts of $C_3$ and/or $C_4$ olefin material ranging from about 0.1 to about 5, and preferably from about 0.2 to about 3, weight percent of the entire catalyst bed can be suitably employed.

Gasiform products from the riser and the stripping operations in vessel 26 and peripheral region 40 are ultimately conveyed to plenum chamber 16 and from there pass through conduit 18 to a downstream separation facility (not shown).

The embodiment of the process shown in FIG. 2 is essentially like that described in connection with FIG. 1 except for the manner in which the comparatively denser particles of ZSM-5 catalyst are separated from the zeolite Y catalyst particles in the stripper. Descending catalyst bed 22 situation within an outer region of the stripping zone encounters streams of stripping gas, e.g., steam, introduced through conduits 27 and 28 which tends to lift the less dense particles of zeolite Y catalyst up concentrically arranged vertical conduits 60 and 61, respectively. The more dense particles of ZSM-5 catalyst continue to flow downwardly where they eventually enter return conduit 65 for return to riser 10. The source of stripping gas is advantageously placed below perforated baffles 67 so that the gas tends to force the less dense zeolite Y catalyst particles towards baffles 68, the latter guiding the flow of the zeolite Y catalyst particles up conduits 60 and 61. The upper section of conduits 60 and 61 lead to one or more cyclone separators 70 and 71 which convey the separated spent zeolite Y catalyst particles through conduits 72 and 73 to the regenerator.

From the aforedescribed preferred embodiments of the process for upgrading naphtha herein, it will be appreciated that due to the separation of ZSM-5 catalyst particles from zeolite Y catalyst particles in the stripper together with the comparatively prolonged residency time of ZSM-5 catalyst particles in the riser, it is possible to have much of the ZSM-5 catalyst particles bypass the regenerator altogether. As a result, the ZSM-5 catalyst particles can be retained in the catalyst inventory at a relatively high level of activity therein for a longer average period of time than would be the case were the circulation rate of the ZSM-5 catalyst particles the same as or similar to that of the zeolite Y catalyst particles.

Having thus provided a general discussion of the present invention and described specific embodiments in support thereof, it is to be understood that no undue restrictions are to be imposed by reason thereof except as provided by the following claims.

What is claimed is:

1. A fluidized catalytic cracking process undertaken in a single riser which comprises introducing a heavy feed comprising 343 C+ (650 F.) hydrocarbons and passing it up through the riser in the presence of a cracking catalyst having a settling rate in the riser, to provide lighter products including naphtha product; and deactivated cracking catalyst which is stripped in a catalyst stripper, and regenerated in a regenerator and recycled to the riser to contact more heavy feed characterized by (a) use of an additive component which contains a shape selective crystalline silicate zeolite catalyst which has a higher settling rate than the settling rate of the cracking catalyst so as to reside in the riser for a longer period of time than the cracking catalyst component and introducing naphtha to the riser downstream of the heavy charge in the presence of the additive component to produce a gasoline product; and (b) separating the additive from the cracking catalyst upstream of the regenerator and recycling directly to the riser the additive component without passing the additive component through the regenerator to reduce the residence time of the additive in the regenerator relative to the cracking catalyst and increase the residence time of the additive component in the riser reactor relative to the cracking catalyst.

2. The process of claim 1 further characterized in that the additive is separated from the cracking catalyst by elutriation.

3. The process of claim 2 further characterized in that the riser reactor has an enlarged portion near the outlet of the riser whereby catalyst elutriation occurs in the top of the riser.

4. The process of claim 2 further characterized by elutriating catalyst in the catalyst stripper.

5. The process of claim 1 further characterized in that the additive has a different size than the cracking catalyst and the catalyst stripper acts as a sieve to separate additive from cracking catalyst.

6. The process of claim 4 further characterized in that the additive and cracking catalyst contact a stripping gas having a superficial vapor velocity sufficient to effect a separation by elutriation of additive from cracking catalyst based on different settling rates.

7. The process of claim 1 further characterized in that the average particle size of the cracking catalyst ranges from 20 to 150 microns and the average particle size of the additive ranges from 500 to 70,000 microns.

8. The process of claim 1 further characterized in that the average packed density of the cracking catalyst ranges from 0.4 to 1.1 $gm/cm^3$ and the average packed density of the additive ranges from 0.6 to 4.0 $gm/cm^3$.

* * * * *